US 9,650,962 B2

(12) United States Patent
Karam

(10) Patent No.: US 9,650,962 B2
(45) Date of Patent: May 16, 2017

(54) ROTOR NOISE SUPPRESSION

(71) Applicant: Rolls-Royce Corporation, Indianapolis, IN (US)

(72) Inventor: Michael Abraham Karam, Plainfield, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 576 days.

(21) Appl. No.: 14/143,343

(22) Filed: Dec. 30, 2013

(65) Prior Publication Data

US 2015/0040538 A1 Feb. 12, 2015

Related U.S. Application Data

(60) Provisional application No. 61/775,100, filed on Mar. 8, 2013.

(51) Int. Cl.
F02B 27/04 (2006.01)
F02C 7/24 (2006.01)
B64C 11/48 (2006.01)
F01D 5/14 (2006.01)
F02K 3/02 (2006.01)
F02C 3/067 (2006.01)
(Continued)

(52) U.S. Cl.
CPC .............. F02C 7/24 (2013.01); B64C 11/48 (2013.01); F01D 5/142 (2013.01); F02C 3/067 (2013.01); F02C 6/206 (2013.01); F02K 3/025 (2013.01); B64C 2230/04 (2013.01); B64C 2230/14 (2013.01); B64C 2230/16 (2013.01); B64C 2230/28 (2013.01); B64D 2027/005 (2013.01); F05D 2220/324 (2013.01); F05D 2220/325 (2013.01); F05D 2260/60 (2013.01); F05D 2260/96 (2013.01); Y02T 50/166 (2013.01); Y02T 50/66 (2013.01); Y02T 50/673 (2013.01)

(58) Field of Classification Search
None
See application file for complete search history.

(56) References Cited

U.S. PATENT DOCUMENTS 3,572,960 A 3/1971 McBride
3,572,961 A 3/1971 Medawar
3,677,503 A 7/1972 Freeman, Jr.
(Continued)

FOREIGN PATENT DOCUMENTS

DE 10 2009 036011 A1 2/2011
EP 2090765 A2 8/2009
GB 2169968 A 7/1986

OTHER PUBLICATIONS

International Search Report and Written Opinion, mailed Oct. 30, 2014, for International Patent Application No. PCT/US2013/078410, filed Dec. 31, 2013.
(Continued)

Primary Examiner — Thomas Denion
Assistant Examiner — Diem Tran
(74) Attorney, Agent, or Firm — Barnes & Thomburg LLP

(57) ABSTRACT

An apparatus is disclosed that includes a gas turbine engine including a first rotor blade axially adjacent a second rotor blade and an aperture formed in one of the first rotor blade and the second rotor blade and structured to emit a fluid therefrom. A fluid source is in flow communication with the aperture and configured to flow the fluid through the aperture.

19 Claims, 3 Drawing Sheets

(51) Int. Cl.
*F02C 6/20* (2006.01)
*B64D 27/00* (2006.01)

(56) References Cited

U.S. PATENT DOCUMENTS

| | | |
|---|---|---|
| 3,776,363 A | 12/1973 | Kuethe |
| 3,844,677 A | 10/1974 | Evans et al. |
| 4,089,618 A | 5/1978 | Patel |
| 4,131,387 A * | 12/1978 | Kazin .................... F01D 5/141 415/119 |
| 4,199,295 A | 4/1980 | Raffy et al. |
| 4,370,097 A * | 1/1983 | Hanson .................. B64C 11/16 415/119 |
| 6,004,095 A | 12/1999 | Waitz et al. |
| 6,139,259 A | 10/2000 | Ho et al. |
| 6,375,416 B1 | 4/2002 | Farrell et al. |
| 6,948,906 B2 | 9/2005 | Leishman et al. |
| 9,102,397 B2 * | 8/2015 | Wood ...................... B64C 11/18 |
| 2010/0034640 A1 | 2/2010 | Dev |
| 2010/0124500 A1 | 5/2010 | Lebrun |
| 2012/0107133 A1 | 5/2012 | Guillaume et al. |

OTHER PUBLICATIONS

International Search Report and Written Opinion, International Application No. PCT/US2013/078410, search completed Oct. 23, 2014, 11 pages.
Brookfield, J.M.; Waltz, I.A.; Trailing-Edge Blowing for Reduction of Turbomachinery Fan Noise; Journal of Propulsion and Power; vol. 16, No. 1, Jan.-Feb. 2000I; pp. 57-64.

* cited by examiner

ROTOR NOISE SUPPRESSION

CROSS-REFERENCE TO RELATED APPLICATIONS

This application claims priority to U.S. Provisional Application Ser. No. 61/775,100, entitled "Rotor Noise Suppression," filed Mar. 8, 2013, which is incorporated herein by reference in its entirety.

FIELD OF THE INVENTION

The present invention generally relates to reduction in noise of rotor blades, and more particularly, but not exclusively, to the noise reduction of open rotor blades driven by gas turbine engines.

BACKGROUND

Noise suppression techniques useful with bladed rotors that are driven by internal combustion engines, such as a gas turbine engine, remains an area of interest. Some existing systems have various shortcomings relative to certain applications. Accordingly, there remains a need for further contributions in this area of technology.

SUMMARY

One embodiment of the present invention is a unique rotor noise suppression system for use with a gas turbine engine. Other embodiments include apparatuses, systems, devices, hardware, methods, and combinations for rotor noise suppression. Further embodiments, forms, features, aspects, benefits, and advantages of the present application shall become apparent from the description and figures provided herewith.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
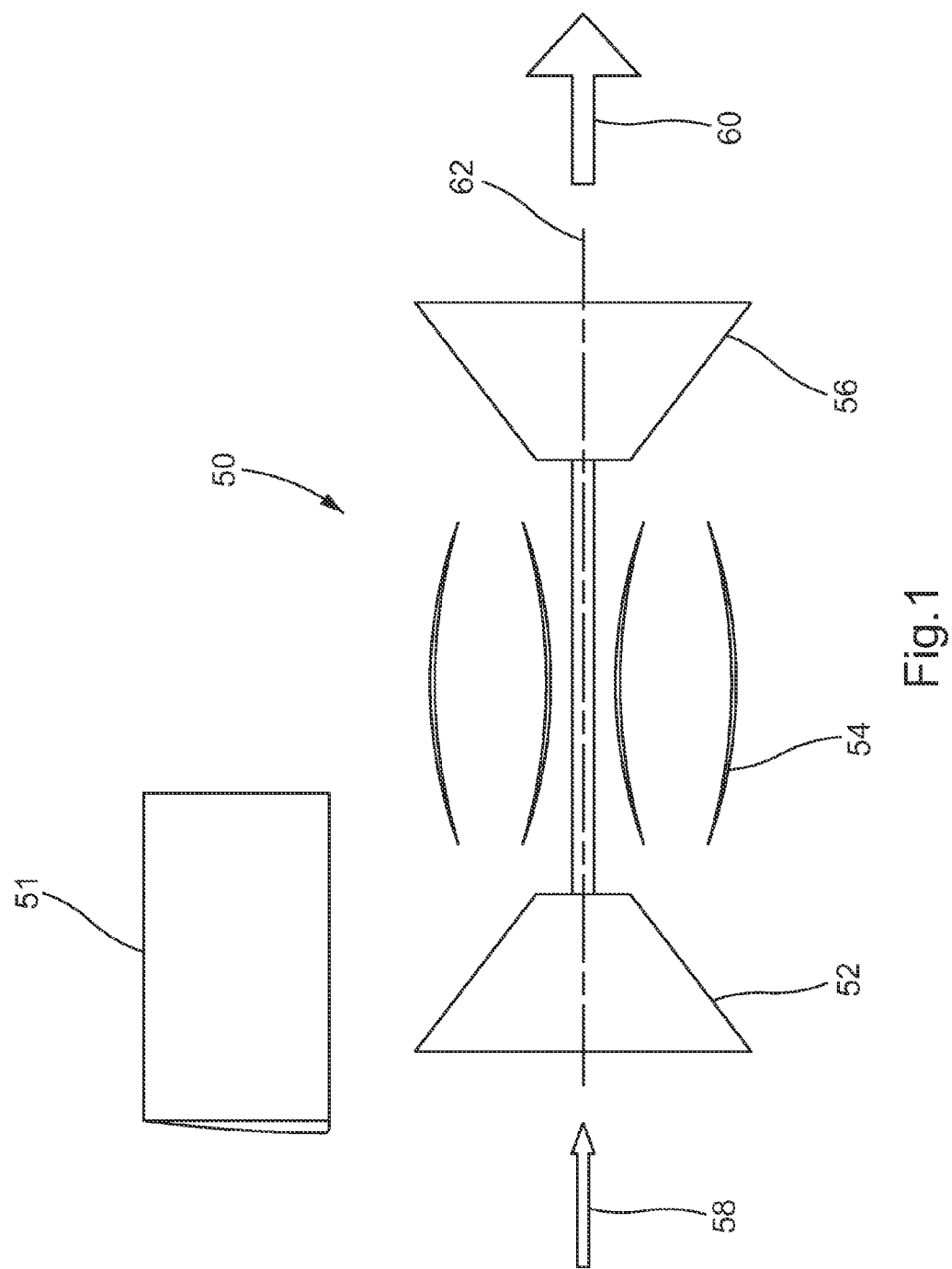
FIG. 1 depicts an embodiment of an internal combustion engine operable to power an aircraft.

For purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

With reference to FIG. 1, one embodiment is disclosed of an internal combustion engine 50 useful to provide a power to an aircraft 51 which can take the form of mechanical and/or electrical power to drive, for example, accessories associated with either or both of the engine 50 and aircraft 51. Though the internal combustion engine 50 is depicted in the form of a gas turbine engine, the engine 50 can take a variety of other forms including, but not limited to, reciprocating engines and rotary engines.

As used herein, the term "aircraft" includes, but is not limited to, helicopters, airplanes, unmanned space vehicles, fixed wing vehicles, variable wing vehicles, rotary wing vehicles, unmanned combat aerial vehicles, tailless aircraft, hover crafts, and other airborne and/or extraterrestrial (spacecraft) vehicles. Further, the present inventions are contemplated for utilization in other applications that may not be coupled with an aircraft such as, for example, industrial applications, power generation, pumping sets, naval propulsion, weapon systems, security systems, perimeter defense/security systems, and the like known to one of ordinary skill in the art.

In the illustrated embodiment, the internal combustion engine 50 includes a compressor 52, combustor 54, and turbine 56 which together are used together to produce a useful power. Though the gas turbine engine 50 is disclosed as a single spool turbojet engine, in other embodiments the gas turbine engine 50 can be a multi spool engine. In any number of embodiments the gas turbine engine 50 can be an axial flow, centrifugal flow, or mixed flow engine. In some embodiments the gas turbine engine 50 can be an adaptive and/or variable cycle engine.

Figure 2:
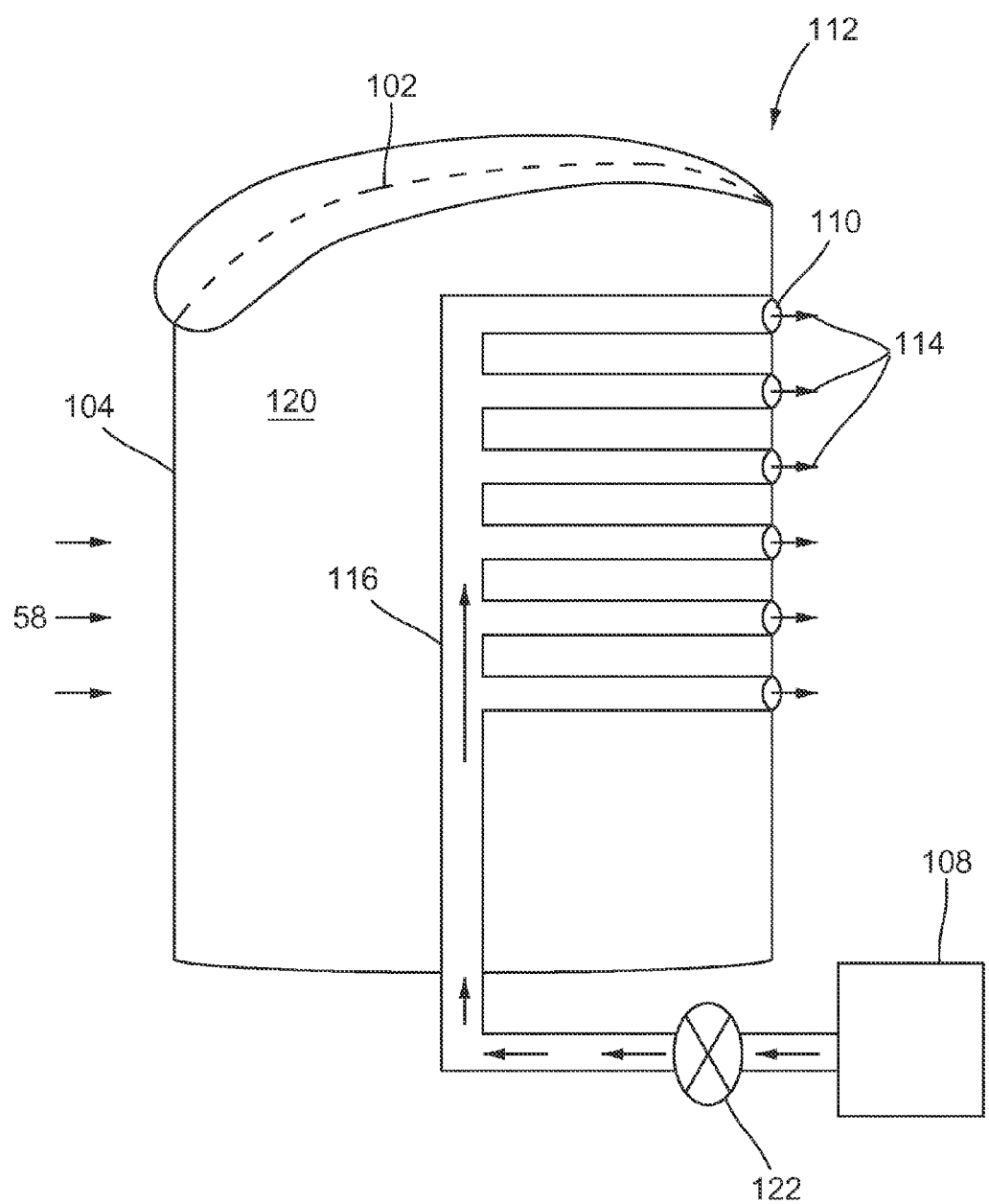
FIG. 2 depicts an airfoil member in communication with a fluid source to reduce rotor noise.

With reference to FIG. 2, a rotatable airfoil member 120 is depicted and includes a leading edge 104, a trailing edge 112, and a mean camber line 102. The rotatable airfoil member 120 is structured to be drivingly rotated about an axis such as an engine axis associated with the gas turbine engine 50. In one form the rotatable airfoil member 120 is an open rotor structured to rotate about a centerline of the gas turbine engine. The airfoil member 120 includes at least one aperture 110 in flow communication with a fluid source 108, and through which a fluid can be ejected that originates with the fluid source 108. The fluid source 108 can be a fluid flow path within the gas turbine engine 50 that conveys products of combustion produced in the combustor 54 and that is ultimately exhausted from the gas turbine engine 50 through the turbine 56 and out a discharge opening. As used herein, therefore, the term "exhaust flow" includes flow at the discharge opening, as well as flow produced from the combustor 54 that is being exhausted through the turbine 56. The fluid source 108 can be a flow path through the turbine 56, or a flow path located between the turbine 56 and a discharge opening through which an exhaust flow exits the gas turbine engine 50 and/or aircraft 51. The fluid source 108 can pick up flow from any position within the turbine 56, for example at an upstream, midstream, or downstream stage of the turbine 56. In some forms the fluid source can pick up flow after a final stage of the turbine 56 and before the discharge opening.

In the illustrated embodiment a plurality of the apertures 110 are disposed radially outwardly along the span of the airfoil member 120. The aperture 110 can take any variety of forms and shapes such as round or oblong form, a singular slot or series of slots disposed along the airfoil member 120, etc. Not all apertures associated with the airfoil member 120 need be the same. Some variation can be present in the apertures. For example, some apertures 110 located closest to a root of the airfoil member 120 can have different shapes than apertures 110 located closer to a tip of the airfoil member 120. In short, the aperture 110 can take any form such that a fluid 114 received from the fluid source 108 can exit from the airfoil 120 through the aperture 110. The aperture 110 can also be located in any variety of chord locations. For example, the aperture 110 can be located near the trailing edge 112 of the airfoil member 120. In one form, the aperture 110 is located at an intersection of the mean camber line 102 and the trailing edge 112. The aperture 110 can be flush with the airfoil 120 at a location where the fluid 114 exits the airfoil 120.

A flow channel 116 places the aperture 110 in flow communication with the fluid source 108. The flow channel 116 extends within the airfoil 120 and can terminate at the aperture 110. A plurality of flow channels 116 can extend from the fluid source 108 to the aperture 110, or alternately a single flow channel 116 can split into a plurality of flow channels 116 to provide the fluid 114 to the aperture 110. A flow regulator 122 can control a flow of the fluid 114 through the flow channel 116. The flow regulator 122 can take the form of a valve 122 which can be a simple on/off valve, a variable flow valve, or any other valve 122 which can alter a flow of the fluid 114 through the flow channel 116.

Figure 3:
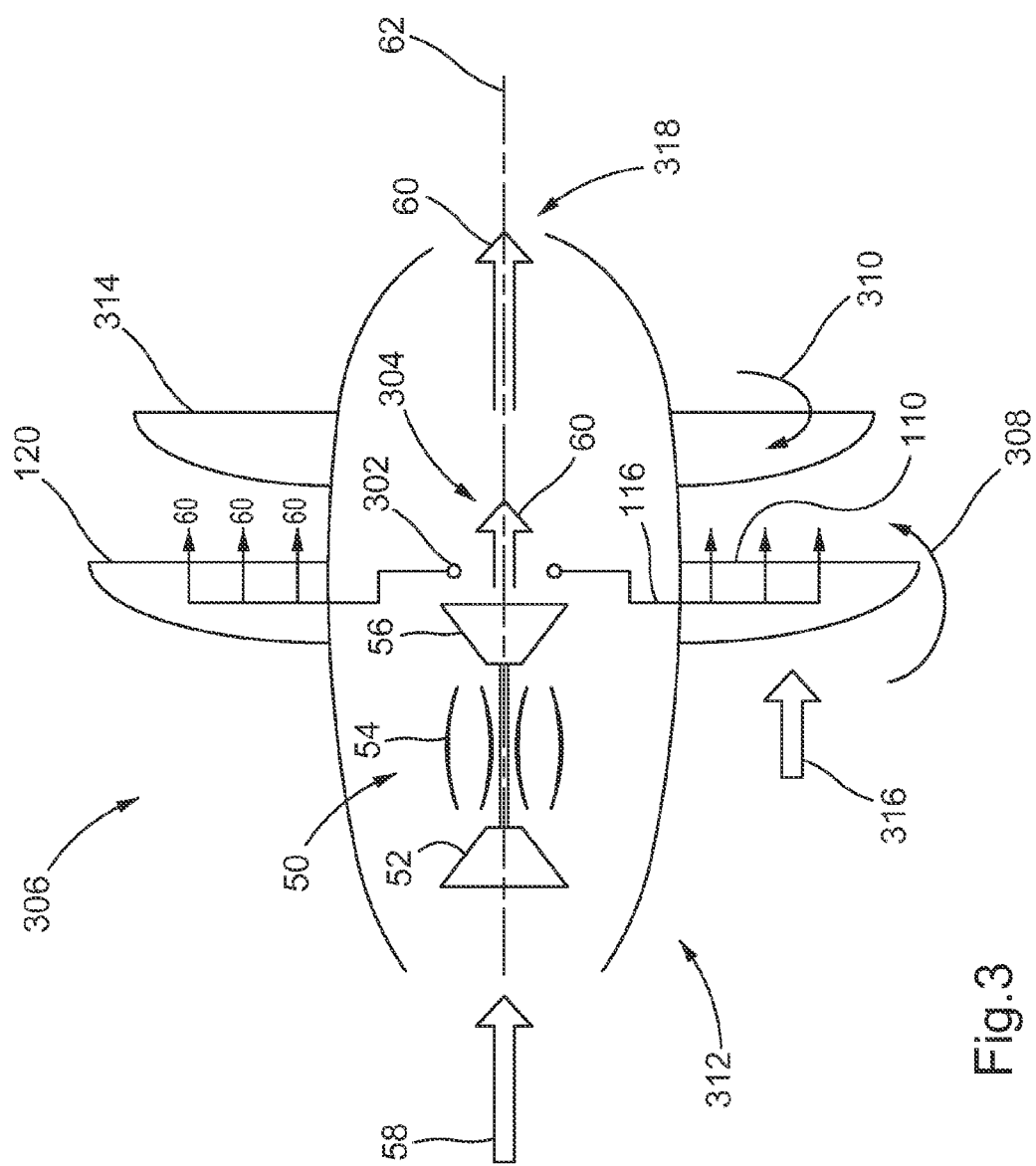
FIG. 3 depicts an embodiment of a rotor noise suppression system utilized in an open rotor configuration.

Referring to FIG. 3, a portion of the exhaust gas 60 is utilized as the fluid 114. An exhaust portion 304 is located between the turbine 56 of the gas turbine engine 50 and an exhaust exit 318. An inlet 302 to a passage that conveys exhaust gas to the airfoil member 120 receives at least a portion of the exhaust gas 60 from the exhaust portion 304, the exhaust gas 60 flowing through the flow channel 116 and emitting out of the aperture 110, as has been previously described. There can be multiple inlets 302 to supply the exhaust gas 60 to the flow channel 116. In a form of the gas turbine engine 50 which includes multiple turbine stages 56, the inlet 302 can be located between turbine stages 56 and/or can be located downstream of the final turbine stage 56.

The airfoil member 120 is disposed upstream of an airfoil 314, both of which are rotatable about an axis 62. In one form the axis 62 is a centerline axis of the gas turbine engine 50. The airfoil member 120 and the airfoil 314 can be open rotor blades 120, 314 which act upon a working fluid 316 and increase a velocity of the free stream 316. In an open rotor architecture 306, the airfoil member 120 and the airfoil 314 act upon the free stream 316 to provide a motive force for the aircraft 51. Various configurations of open rotor concepts will be appreciated, one of which shows the airfoil members 120 and 314 positioned at an aft location relative to a nacelle 312 as depicted in the illustrated embodiment. The nacelle 312 in the illustrated embodiment includes an upstream inlet structured on a forward end to receive the working fluid 58, and the exhaust exit 318 on an aft end of the nacelle 312. The free stream 316 can be defined as an airflow which is not directly acted upon or directly affected by turbomachinery within the casing (not shown) of the gas turbine engine 50. The exhaust gas 60 emitted from the airfoil 120 alters a velocity gradient of the working fluid 316 downstream of the airfoil 120 and upstream of the airfoil 314 in a manner such that a reduction in the amount of noise produced by airfoil 314 as it is rotated through the working fluid 316 can occur. The exhaust gas 60 emitted from the airfoil 120 reduces the impact of the blade wake on the airfoil 314. In one embodiment both the airfoil member 120 and airfoil 314 can include the apertures 110 discussed above.

The airfoil member 120 and the airfoil member 314 can be counter rotating relative to one another such that the airfoil member 120 can be rotated in a first direction 308 and the airfoil 314 can be rotated in a second direction 310, the first direction 308 being opposite the second direction 310.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. An apparatus, comprising:
   an internal combustion engine configured to produce an exhaust gas as a result of a combustion process involving a fuel;
   a first airfoil member located upstream of a second airfoil member wherein the first and second airfoil members are driven by work produced from the internal combustion engine;
   an aperture disposed in at least one of the first airfoil member and the second airfoil member and structured to flow the exhaust gas;
   an auxiliary exhaust flowpath extending from the internal combustion engine and arranged to convey the exhaust gas, the auxiliary exhaust flowpath operable to provide the exhaust gas to the aperture disposed in at least one of the first airfoil member and the second airfoil member; and
   an exhaust exit structured to flow exhaust gas, the exhaust exit located aft of the first airfoil member and the second airfoil member.

2. The apparatus of claim 1, wherein the first airfoil member is a first rotatable blade and the second airfoil member is a second rotatable blade, wherein the first rotatable blade is positioned upstream of the second rotatable blade, and wherein the internal combustion engine is a gas turbine engine.

3. The apparatus of claim 2, wherein the aperture is disposed near a trailing edge portion of the first rotatable blade and wherein the aperture is disposed at a point of intersection of a mean camber line and a trailing edge of the first airfoil member.

4. The apparatus of claim 3, wherein the aperture includes a series of apertures along the trailing edge portion, each aperture having a radial relation to each of the other apertures.

5. The apparatus of claim 2, wherein the first rotatable blade is a first open rotor, the second rotatable blade is a second open rotor, and wherein the exhaust gas is a flow of products of combustion extracted from the gas turbine engine downstream of a combustor of the gas turbine engine.

6. The apparatus of claim 5, wherein the first open rotor rotates contra to the second open rotor.

7. The apparatus of claim 5, wherein the gas turbine engine includes an internal flow between a turbine and an exhaust opening, and wherein the auxiliary exhaust flowpath includes an upstream portion located between a turbine stage of the turbine and the exhaust opening.

8. The apparatus of claim 7, which further includes a flow regulator in fluid communication with the auxiliary exhaust flowpath.

9. An apparatus, comprising:
a gas turbine engine structured to produce work through the expansion of an exhaust fluid flow to drive a rotor system having a plurality of rotor blades, the rotor system including a first rotor blade positioned immediately upstream of a second rotor blade such that a flow path between the first rotor blade is unobstructed from the second rotor blade, wherein one of the first rotor blade and the second rotor blade is structured to receive a portion of the exhaust fluid flow and eject the portion of exhaust flow to a working fluid stream that is accelerated by rotation of the first rotor blade or second rotor blade, wherein the gas turbine engine further includes an exhaust exit located aft of the first rotor blade and the second rotor blade and the exhaust exit is structured to flow exhaust gas therethrough.

10. The apparatus of claim 9, wherein the first rotor blade includes an aperture through which the exhaust fluid flow is ejected.

11. The apparatus of claim 10, wherein the aperture is disposed near a trailing edge of the first rotor blade.

12. The apparatus of claim 11, wherein the first rotor blade is structured to rotate in a direction opposite the second rotor blade, and wherein the exhaust fluid flow is extracted from the gas turbine engine.

13. The apparatus of claim 11, wherein the first rotor blade includes a plurality of first rotor blades each including an aperture disposed near a trailing edge portion, the apertures associated with each of the plurality of rotor blades structured to eject the exhaust fluid flow.

14. The apparatus of claim 13, wherein the aperture associated with each of the plurality of first rotor blades includes a plurality of apertures, each aperture of the plurality of apertures located at a different radial position relative to each of the other apertures.

15. A method, comprising:
operating a gas turbine engine to compress a fluid, combust a mixture of the fluid and a fuel, and discharge the fluid forming an exhaust gas from the gas turbine engine through an opening downstream of a turbine;
providing power from the gas turbine engine to drive a pair of a first rotatable blade and a second rotatable blade to produce a motive force;
diverting a portion of the exhaust gas away from the opening to a flow channel in the first rotatable blade;
flowing the exhaust gas from the flow channel through an aperture in the first rotatable blade; and
flowing a portion of the exhaust gas through an exhaust exit located aft of the first rotatable blade and the second rotatable blade.

16. The method of claim 15, which further includes altering a velocity gradient of an airflow upstream of the second rotatable blade as a result of the flowing.

17. The method of claim 16, which further includes regulating the amount of exhaust gas flowing through the aperture.

18. The method of claim 16, wherein diverting a portion of exhaust gas from a gas turbine engine further includes diverting a portion of exhaust gas downstream of a final turbine stage, and wherein the flowing exhaust gas through the aperture includes flowing exhaust gas through a plurality of apertures arranged along a span of the first rotatable blade.

19. The method of claim 18, which further includes rotating the second rotatable blade in a direction opposing the rotation of the first rotatable blade.

* * * * *